Patented July 4, 1950

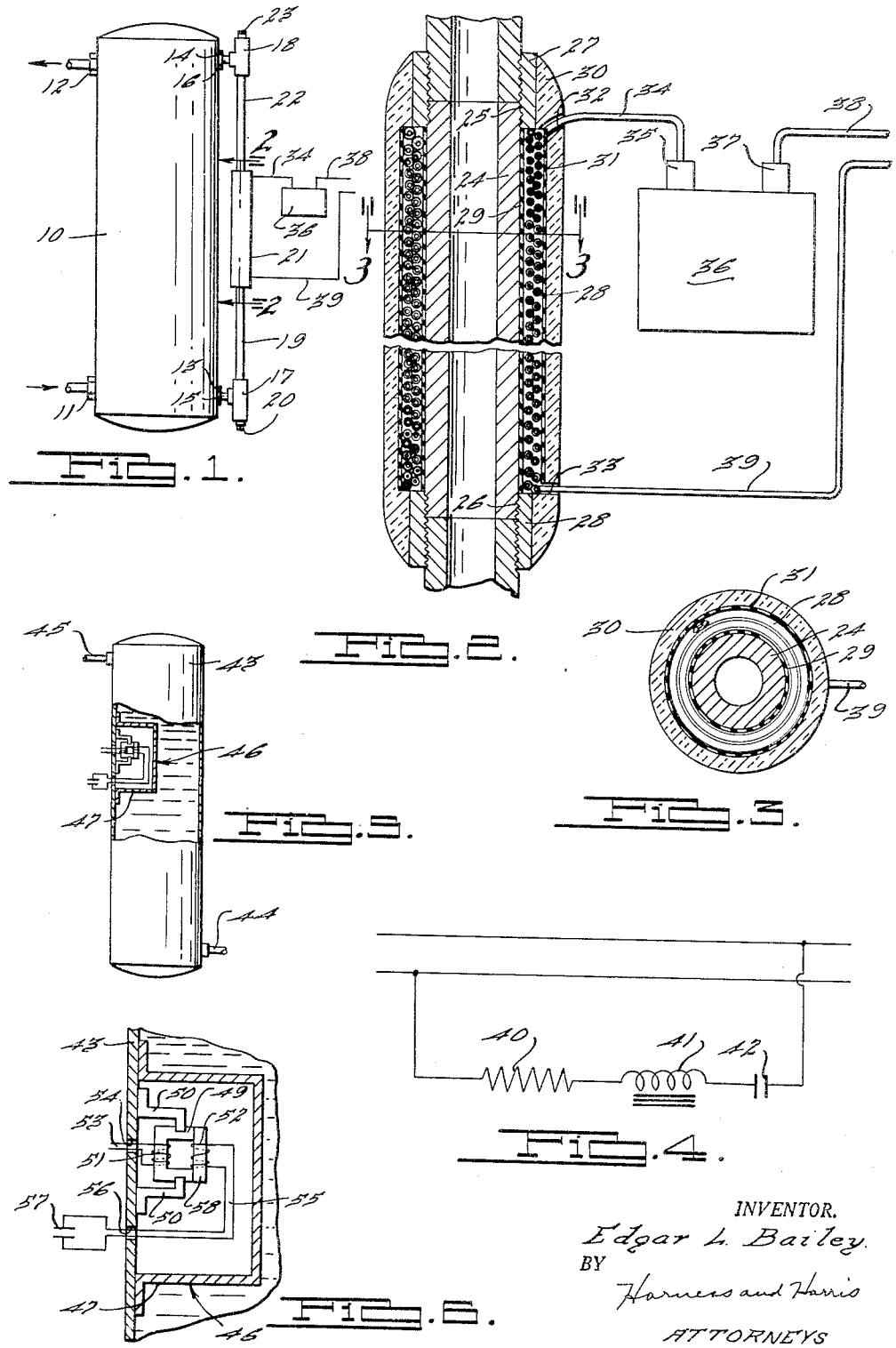

2,513,779

UNITED STATES PATENT OFFICE 2,513,779

HEATING APPARATUS

Edgar L. Bailey, Birmingham, Mich., assignor to Chrysler Corporation, Highland Park, Mich., a corporation of Delaware Application February 6, 1948, Serial No. 6,644

11 Claims. (Cl. 219—38)

My invention relates to heating apparatus and more particularly to apparatus of the electrically energized and controlled type for heating liquid.

One of the principal objects of my invention is to provide heating apparatus of the type which is readily adaptable to heat water for domestic and commercial use.

Another object of my invention is to provide heating apparatus with electrically controlled heating means for gradually applying heat to the liquid.

A further object of my invention is to provide heating apparatus having inherent control features thereby eliminating the need of all thermostats, switches, and the like.

Still another object of my invention is to provide heating apparatus which will demand a small amount of electrical power for use over a long period of time instead of a large amount of power over a short period of time thereby eliminating overloading of the power supply circuit.

Other objects and advantages of my invention will become more apparent from the following description taken in conjunction with the accompanying drawings in which:

Fig. 1 is side elevational view of heating apparatus embodying my invention.

Fig. 2 is a vertical sectional view taken on line 2—2 of Fig. 1 of the heating element used in my improved heating apparatus.

Fig. 3 is a transverse sectional view taken on the line 3—3 of Fig. 2.

Fig. 4 is a schematic view of the electric circuit shown in Figs. 1 and 2.

Fig. 5 is a side elevational view partly in section showing a modified form of my invention.

Fig. 6 is a fragmentary, enlarged, vertical sectional view of the heating unit embodied in the form of the invention illustrated in Fig. 5.

Referring now to Figs. 1, 2, 3 and 4, I have shown a conventional heating tank 10 having a liquid inlet 11 and an outlet 12 for, respectively receiving liquid to be heated and dispersing same after it has been heated. The tank 10 is also provided with ports 13 and 14 for receiving one extremity of pipes 15 and 16, respectively. The other extremity of the pipes 15 and 16 are threaded to be received in T-fittings 17 and 18, respectively. The fitting 17 has a pipe 19 threaded into one extremity of its T-structure, while the other extremity of the T-structure is provided with a plug 20 threaded therein. The pipe 19 extends upwardly from the T-fitting 17 to be received in the lower extremity of a heating unit generally designated by the numeral 21.

The fitting 18 is similarly provided with a pipe 22 threaded in one extremity of its T-structure and is similarly provided at its other extremity with a threaded plug 23. The pipe 22 extends downwardly from the fitting 18 to be received in the upper extremity of the heating unit 21. The plugs 20 and 23 may be removed to facilitate cleaning of the entire heating unit.

The heating unit 21 comprises a heat transfer tube 24 which is positioned between and securely fitted to the adjoining extremities of the pipes 19 and 22 and is provided with threaded ends 25 and 26 which have collars 27 and 28, respectively, threaded thereon. The adjoining extremities of pipes 19 and 22 are similarly threaded to be received within the threaded collars 28 and 27, respectively. A coil 28 is wound around the tube 24 and is separated from the tube by an elongated cylindrical insulator 29. The entire heating unit is enclosed within a cylindrical casing 30 which is similarly separated from the coil 28 by a cylindrical insulator 31. The casing 30 has disposed therein a pair of passages 32 and 33 for receiving the electrical connections of the coil 28. The passage 31 accommodates a wire 34 which connects one extremity of the coil 28 to one contact 35 of a capacitor 36. The other contact 37 of the capacitor is connected by a wire 38 with an electrical source (not shown). The passage 33 accommodates a wire 39 which is connected to the other extremity of the coil 28 and to the electrical source (not shown).

The magnetic characteristics of the metal of the heat transfer tube 24 are such that its permeability varies inversely with temperature changes. Certain alloys of metals such as nickel and iron have these characteristics and at certain temperatures known as their "Curie" points they become ineffective to pass significant magnetic flux. By selecting the proper alloy composition and proportions of alloy constituents, it is possible to predetermine quite accurately the maximum temperature to which material or liquid may be heated. For example in heating water in accordance with the invention, an alloy comprising approximately about 39% nickel and 61% iron is desirable for this alloy has a "Curie" point of about 100° C. This alloy is commercially known as Carpenter Temperature Compensator No. 30. Various other alloys may be employed depending upon the "Curie" temperature desired.

The tube 24 acts as a core for the coil 28 and therefore its variation in permeability due to temperature change regulates the inductance of the coil. When an alternating electric current is applied to the coil 28 an amount of heat is dissipated therefrom which is dependent upon the circuit characteristis. This heat is transferred to the core 24 thereby creating a heat transfer surface across which the liquid to be heated passes. When the tank 10 is filled with liquid the passage formed by the pipe 15, the T-fitting 17, the pipe 19, the tube 24, the pipe 22, the fitting 18 and the pipe 16 is also filled with liquid. It may also be readily seen when viewing Fig. 1, that when the level of the liquid in the tank 10 is substantially above the halfway mark of the tank, there will be liquid within the tube 24. As the liquid within the tube 24 is heated, it rises and enters the tank through the port 14 and more relatively cool liquid is supplied to the tube 24 from the port 13. In this way the entire liquid content of the tank 10 is heated.

Referring now more particularly to Fig. 4, I have shown a wire diagram of the circuit shown in Figs. 1 and 2. The diagrammatic illustrations of the resistor 40 and inductance 41 appearing in Fig. 4 represent electrically the inherent resistance and the electrical inductance of the coil 28, respectively. The capacitor 42 is the electrical equivalent of the capacitor 36 shown in Figs. 1 and 2. It can be readily seen that the coil and the capacitor are electrically in series. When the core 24 is at a predetermined low temperature, for example when the liquid to be heated has just entered the tank 10, the reactance of the coil is equal to the predetermined reactance of the capacitor. Therefore, since the coil and the capacitor are in series and the two are electrically 180° out of phase in an alternating current circuit, these reactances cancel each other and the only resistance in the circuit is that which is inherent within the coil 28. As a result, a predetermined relatively high amount of current flows in the circuit. This causes a relatively high voltage drop across the coil and consequently the maximum heating of the coil is reached under these conditions.

As heretofore described, when the coil 28 supplies heat to the heat transfer tube 24 and thus to the liquid within the tube, the temperature of the tube gradually rises which causes the permeability to gradually decrease. Under these conditions, the ability of the tube 24 to conduct magnetic flux therethrough similarly decreases and the inductive reactance of the coil is not great enough to counterbalance the capacitive reactance of the capacitor 36. Therefore, the overall resistance of the circuit is now determined not only by the inherent resistance of the coil 28, but also by that portion of capacitive reactance which is not counterbalanced by the reactance of the coil. Since now there is more impedance within the circuit, the current is less, the voltage drop across the coil is correspondingly less and the heat supplied by the coil is less.

As the temperature of the core 24 gradually approaches a predetermined high temperature, more and more impedance is added to the circuit since more and more of the capacitive reactance of the capacitor is not counterbalanced by the reactance of the coil. When this predetermined high temperature is reached by the core 24, which is commonly referred to as its "Curie" point, the core 24 is no longer able to pass magnetic flux. Therefore, the inductive reactance of the coil 28 is very small compared to the capacitive reactance of the capacitor 36 and the resulting very high impedance in the circuit limits the current to a value which is inadequate to significantly heat the tube 24. As the temperature of the core 24 decreases as a result of cooler liquid entering the heating unit 21, the core again starts to conduct magnetic flux and current once again starts to flow in the circuit.

Figs. 5 and 6 illustrate a modification of my invention shown in Figs. 1, 2, 3 and 4. A tank 43 is provided with inlet and outlet ports 44 and 45, which are adapted to receive and deliver liquid to be heated to and from the tank. A heating unit generally designated by the numeral 46 is positioned within the tank 43 and is enclosed within a casing 47 which is secured to the inner wall of the tank 43, and filled with heat conducting medium such as oil.

The unit 46 comprises a transformer core 49 secured to the inner wall of tank 43 by a pair of brackets 50 and having a primary coil 51 and a secondary coil 52 wound thereon. The primary coil 51 is provided with leads 53 which extend through the opening 54 in the tank 43 and are connected to an electrical source of A. C. current (not shown). The combination of the coil 51, the leads 56 and the source comprise a primary circuit.

The secondary coil 52 is provided with leads 55 which extend through the opening 56 in the tank 43 and are connected to a capacitor 57 so that the coil 52 and the capacitor 57 are electrically in series. The combination of the coil 52, the leads 55 and the capacitor 57 form a secondary circuit. The openings 54 and 56 through which the leads 53 and 55 extend are sealed in a conventional manner not shown to prevent the escapement of the contents of the casing 47. That portion of the core 49 designated by the numeral 58 on which the coil 52 is wound and the coil 52 comprise the heat transfer surfaces of the unit. The portion 58 is electrically connected to the rest of the core 49 and may be made of the same material as used in the structure shown in Figs. 1 through 4 such as a nickel alloy.

When current flows in the primary circuit, the coil 51 causes the flow of magnetic flux through the core 49 and portion 58 thereby inducing a voltage across the coil 52 which in turn causes current to flow in the secondary circuit. It can be readily seen that the core portion 58 acts as a core for the coil 52 and thereby regulates both the inductance and the inductive reactance of the coil 52. The properties of the core portion 58 are such that as its temperature rises, its ability to pass magnetic flux decreases. As a result the inductance and inductive reactance of the coil 52 also decreases as the temperature rises. This rise in temperature is caused by the heat dissipated by the coil 52, due to its inherent resistance when current flows in the secondary circuit.

The value of the capacitor 57 is predetermined so its reactance to equal the reactance of the coil 52 when the temperature of the core portion 58 is at a relatively low value such as when liquid to be heated first enters the tank. Since the reactances of a coil and a capacitor in series are 180° out of phase and since the reactances of the coil 52 and the capacitor 57 are equal at the aforementioned low temperature the reactances cancel each other and the only resistance left within the secondary circuit is that which is inherent within the coil 52. As a result a large amount of current flows in the secondary circuit due to the low amount of impedance therein and a large amount of heat is dissipated from the coil 52. This heat is transferred to the core portion 58 due to the close proximity of the coil 52 thereto and hence to the liquid to be heated through the heat conducting medium and the casing 47.

As the temperature of the core portion 58 rises, it loses the ability to pass magnetic flux thereby reducing the inductive reactance of the coil 52. As a result the capacitive reactance of the capacitor 57 is not counterbalanced by the reactance of the coil 52 and additional impedance besides that which is inherent within the coil 52 is added to the secondary circuit.

With additional impedance in the secondary circuit, the current therein is accordingly reduced which in turn reduces the heat dissipated by coil 52. The inductive reactance of the coil 52 continues to decrease until a predetermined high temperature is reached. At this temperature, which is commonly referred to as the "Curie" point of the core portion 58, the portion 58 is no longer able to pass magnetic flux, the reactance of the coil 52 is very low, the current in the secondary circuit is very low since the impedance in the circuit is very high, and the coil 52 is unable to dissipate enough heat to heat the liquid in the tank 43 further. The temperature of the liquid at this point is at a predetermined value.

However, when the temperature of the liquid in the tank 43 is reduced, such as when fresh liquid to be heated enters the tank, the temperature of the core portion is accordingly reduced since this temperature reduction is communicated to the core portion 58 through the casing 47 and the heat conducting medium therein. Under these conditions, magnetic flux again passes through the core portion 58, the impedance of the secondary circuit is reduced and a greater current again flows, the coil 52 dissipates heat, and the liquid in the tank 43 is once again heated until the "Curie" point of the core portion 58 is reached.

It should be noted that in both forms of heating apparatus disclosed herein the current required is varied gradually at all times. It may be easily seen that the temperatures of the core portions and the liquid to be heated rise or fall gradually. As a result when this apparatus is employed no instantaneous overloads of the power circuit supplying electrical current to the apparatus is involved.

Although but several embodiments of the invention are herein shown and described, it will be understood that various changes in the details of construction and materials employed may be made without departing from the spirit of the invention.

I claim:

1. Heating apparatus comprising a container for material to be heated, a heat transfer surface associated with said container comprising a magnetic flux core portion having temperature sensitive permeability, the permeability of said core portion decreasing upon temperature rise to a substantially ineffective value at a predetermined desired temperature, and an electrical system including a combined resistance heating element and flux producing means for impressing a flux in and heating said core portion and a capacitor having a capacity predetermined to form a tuned and detuned circuit with said means when said core portion is at desired predetermined low and high temperatures respectively.

2. Heating apparatus comprising a container for material to be heated, a heat transfer surface associated with said container comprising a magnetic flux core portion having temperature sensitive permeability, the permeability of said core portion decreasing upon temperature rise and finally becoming ineffective to pass magnetic flux when a predetermined high temperature is reached, an electrical system including means for impressing a flux in said core portion, said means having an inherent electrical resistance for dissipating maximum heat to said core portion and said material under predetermined conditions of current flow in said system, and a capacitor in said system having a capacity predetermined to form a tuned circuit with said means when said core portion is at a predetermined low temperature, said circuit departing gradually from said tuned condition as said permeability decreases in response to temperature rise thereby reducing the flow of current in said system gradually until said high temperature is reached at which time said resistance is ineffective to further heat said material.

3. Heating apparatus comprising a container for material to be heated, a heat transfer surface associated with said container comprising a magnetic flux core having a temperature sensitive permeability, the permeability of said core decreasing upon temperature rise and finally becoming substantially ineffective to pass magnetic flux when a predetermined high temperature is reached, a circuit including means for impressing a flux in said core, said means having an inherent electric resistance for dissipating maximum heat to said core and said material when a predetermined current flows in said circuit, and a capacitor in said circuit having a capacity predetermined to cooperate with said means for tuning said circuit when said core is at a predetermined low temperature, said circuit departing gradually from said tuned condition as said permeability decreased in response to temperature rise thereby reducing the flow of said current in said circuit gradually until said high temperature is reached at which time said resistance is ineffective to further heat said material.

4. Apparatus for heating liquid comprising a heat transfer surface having a magnetic flux core in the form of a tube for accommodating the flow of liquids therethrough, said core comprising metal having a temperature sensitive permeability which decreases upon temperature rise and finally becomes ineffective to pass flux when a predetermined high temperature is reached, an electrical circuit including an inductive coil positioned around said core and adapted to impress a flux therein, said coil having an inherent electrical resistance which facilitates the supply of maximum heat to said core and said liquid when a predetermined current flows in said circuit, and a capacitor in series with said coil in said circuit having a capacity predetermined to form a tuned circuit with said coil when said core is at a predetermined low temperature, said circuit departing gradually from said tuned condition as said permeability decreases in response to temperature rise thereby reducing the flow of said current in said circuit gradually until said high temperature is reached at which time said coil is ineffective to further heat said liquid.

5. Heating apparatus comprising a container for material to be heated, a heat transfer surface in said container comprising a magnetic flux core portion having temperature sensitive permeability, the permeability of said core portion decreasing upon temperature rise and finally becoming ineffective to pass magnetic flux when a predetermined high temperature is reached, an electrical system including a source of electricity, first means for impressing a flux in said core portion, second means for impressing a flux in said core portion, said second means being inductively coupled to said first means and having an inherent electrical resistance which facilitates the supply of maximum heat to said core portion and said material when a predetermined current flows therethrough, and a capacitor in said system having a capacity predetermined to form a tuned circuit with said second means when said core portion is at a predetermined low temperature, said circuit departing gradually from said tuned condition as said permeability decreases in response to temperature rise thereby reducing the flow of said current through said second means gradually until said high temperature is reached at which time said resistance is ineffective to further heat said material.

6. Apparatus for heating water comprising a tank, inlet and outlet ports in said tank for receiving water to be heated and discharging heated water, respectively, a container within said tank and sealed therein from said water, heat conducting medium within said container, a metal core member positioned within said container having a portion thereof provided with magnetic characteristics such that the permeability of said portion decreases on temperature rise and becomes ineffective to pass magnetic flux at a predetermined desired temperature, and an electrical system including a primary coil positioned around said core member for impressing a flux therein, a secondary coil positioned around said core portion and inductively coupled to said primary coil, said primary and secondary coils having an inherent electrical resistance for dissipating maximum heat to said core portion and said medium under predetermined conditions of current flux, and a capacitor having a capacity predetermined to form a tuned circuit with said secondary coil when said core portion is at a predetermined low temperature.

7. Heating apparatus comprising a container for material to be heated, a heat transfer surface associated with said container including a magnetic flux core portion comprising a nickel alloy having temperature sensitive permeability, the permeability of said core portion decreasing upon temperature rise and finally becoming ineffective to pass magnetic flux when a predetermined high temperature is reached, an electrical system including means for impressing a flux in said core portion, said means having an inherent electrical resistance for dissipating maximum heat to said core portion and said material under predetermined conditions of current flow in said system, and a capacitor in said system having a capacity predetermined to form a tuned circuit with said means when said core portion is at a predetermined low temperature, said circuit departing gradually from said tuned condition as said permeability decreases in response to temperature rise thereby reducing the flow of current in said system gradually until said high temperature is reached at which time said resistance is ineffective to further heat said material.

8. Heating apparatus comprising a container for material to be heated, a heat transfer surface associated with said container including a magnetic flux core comprising a nickel alloy having a temperature sensitive permeability, the permeability of said core decreasing upon temperature rise and finally becoming substantially ineffective to pass magnetic flux when a predetermined high temperature is reached, a circuit including means for impressing a flux in said core, said means having an inherent electric resistance for dissipating maximum heat to said core and said material when a predetermined current flows in said circuit, and a capacitor in said circuit having a capacity predetermined to cooperate with said means for tuning said circuit when said core is at a predetermined low temperature, said circuit departing gradually from said tuned condition as said permeability decreases in response to temperature rise thereby reducing the flow of said current in said circuit gradually until said high temperature is reached at which time said resistance is ineffective to further heat said material.

9. Apparatus for heating liquid comprising a heat transfer surface having a magnetic flux core comprising a nickel alloy in the form of a tube for accommodating the flow of liquids therethrough, said core comprising metal having a temperature sensitive permeability which decreases upon temperature rise and finally becomes ineffective to pass flux when a predetermined high temperature is reached, an electrical circuit including an inductive coil positioned around said core and adapted to impress a flux therein, said coil having an inherent electrical resistance which facilitates the supply of maximum heat to said core and said liquid when a predetermined current flows in said circuit, and a capacitor in series with said coil in said circuit having a capacity predetermined to form a tuned circuit with said coil when said core is at a predetermined low temperature, said circuit departing gradually from said tuned condition as said permeability decreases in response to temperature rise thereby reducing the flow of said current in said circuit gradually until said high temperature is reached at which time said coil is ineffective to further heat said liquid.

10. Heating apparatus comprising a container for material to be heated, a heat transfer surface in said container comprising a magnetic flux core portion comprising a nickel alloy having temperature sensitive permeability, the permeability of said core portion decreasing upon temperature rise and finally becoming ineffective to pass magnetix flux when a predetermined high temperature is reached, an electrical system including a source of electricity, first means for impressing a flux in said core portion, second means for impressing a flux in said core portion said second means being inductively coupled to said first means and having an inherent electrical resistance which facilitates the supply of maximum heat to said core portion and said material when a predetermined current flows therethrough and a capacitor in said system having a capacity predetermined to form a tuned circuit with said second means when said core portion is at a predetermined low temperature, said circuit departing gradually from said tuned condition as said permeability decreases in response to temperature rise thereby reducing the flow of said current through said second means gradually until said high temperature is reached at which time said resistance is ineffective to further heat said material.

11. Heating apparatus comprising a container for material to be heated, a heat transfer surface associated with said container comprising a magnetic flux core portion comprising approximately about 39 per cent nickel and 61 per cent iron having temperature sensitive permeability, the permeability of said core portion decreasing upon temperature rise and finally becoming ineffective to pass magnetic flux when a predetermined high temperature is reached, an electrical system including means for impressing a flux in said core portion, said means having an inherent electrical resistance for dissipating maximum heat to said core portion and said material under predetermined conditions of current flow in said system, and a capacitor in said system having a capacity predetermined to form a tuned circuit with said means when said core portion is at approximately 65° F. temperature, said circuit departing gradually from said tuned condition as said permeability decreases in response to temperature rise thereby reducing the flow of current in said system gradually until said high temperature is reached at which time said resistance is ineffective to further heat said material.

EDGAR L. BAILEY.

REFERENCES CITED

The following references are of record in the file of this patent:

UNITED STATES PATENTS

| Number | Name | Date |
|---|---|---|
| 1,260,564 | Magnusson et al. | Mar. 26, 1918 |
| 1,750,640 | Kitteredge et al. | Mar. 18, 1930 |
| 1,981,632 | Northrup | Nov. 20, 1934 |
| 1,990,238 | McDonald | Feb. 5, 1935 |
| 2,265,470 | Black | Dec. 9, 1941 |